June 24, 1947.  L. A. MEACHAM  2,422,696
TIMING CIRCUIT
Filed Nov. 15, 1944   2 Sheets-Sheet 1

INVENTOR
L. A. MEACHAM
BY
Franklin Mohr
ATTORNEY

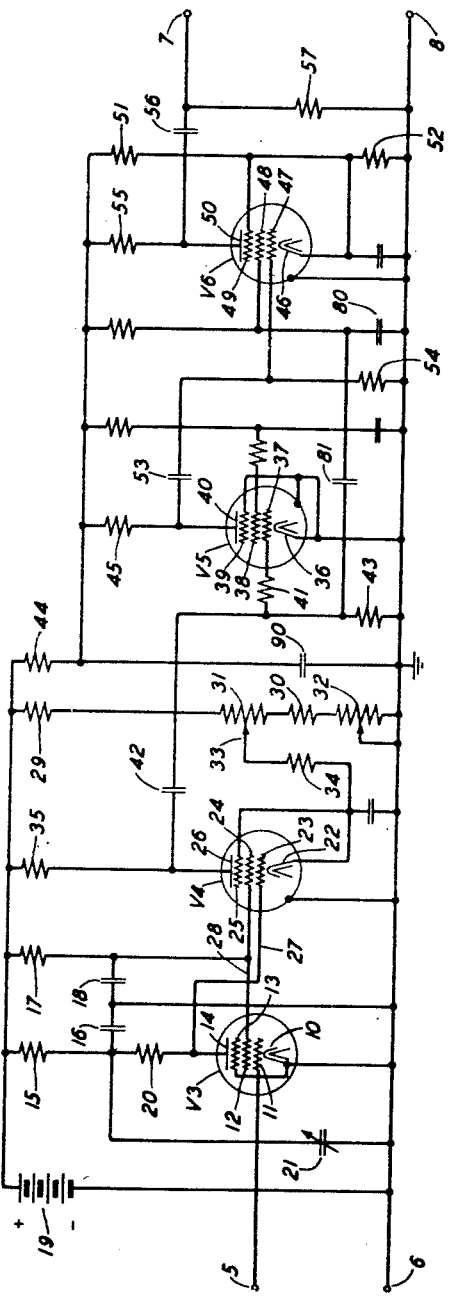

Patented June 24, 1947

2,422,696

UNITED STATES PATENT OFFICE 2,422,696

TIMING CIRCUIT

Larned A. Meacham, Summit, N. J., assignor to Bell Telephone Laboratories, Incorporated, New York, N. Y., a corporation of New York Application November 15, 1944, Serial No. 563,558

7 Claims. (Cl. 161—15)

This invention relates to electrical timing circuits particularly for use in time measuring and range indicating systems.

An object of the invention is to attain improved precision in the control of an adjustable and calibratable time interval marked off between two electric pulses.

The invention is especially adaptable to radar systems of the type wherein an outgoing exploratory pulse is directed toward a target and is also used to start a current in a charging circuit and wherein a range indicating pulse is generated when a selected point in the charging circuit has attained a predetermined potential. The time interval between the dispatching of the exploratory pulse and the generation of the range indicating pulse is made adjustable in order that the instant of generation of the range indicating pulse may be made to coincide with the receipt of an echo pulse from a target whereby the range of the target may be measured.

The range indicating pulse may be generated in accordance with a known method employing a vacuum tube and opposing in the control grid-cathode circuit thereof a steady potential from a calibratable potentiometer against a potential in a charging circuit, which latter potential varies as a function of the time. When a critical or cut-off potential is reached the tube suddenly becomes conducting and the desired range pulse is produced. A screen grid or pentode tube is usually preferred, for various reasons. It is found that the instant at which the critical potential is reached in such a tube depends not alone upon the potentials of the control grid and cathode but also upon the potential difference between the screen grid and cathode. A slight variation in the latter potential difference will result in an error in the measured value of the range.

A feature of the invention is the use of two timing circuits, one of which varies the potential difference between the control grid and cathode and the other the potential difference between the screen grid and cathode. By suitable design of the timing circuits the screen grid is made to assume a substantially constant difference of potential with respect to the control grid during the charging period so that at the instant of generating the range pulse the potential difference between the screen grid and the control grid is the same regardless of the length of the charging period.

In the drawings,

Fig. 2 is a schematic diagram of a timing circuit and range indication generator in accordance with the invention.

Figure 1:
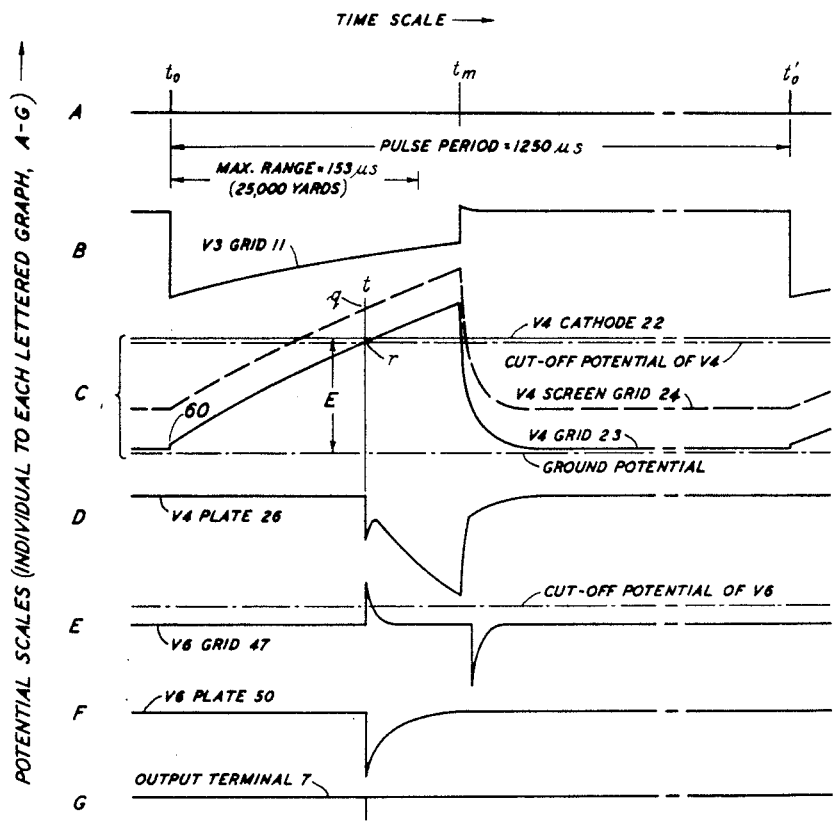
Fig. 1 is a set of graphs showing the variation of potential with time in a circuit employing the invention.

Referring to Fig. 1 the respectively lettered graphs B to G, inclusive, illustrate typical potential variations at specified points of the circuit illustrated schematically in Fig. 2. Graph A shows for reference a sequence of events entering into the utilization of the system of the invention, as for example in a time or distance measuring system such as a radar. The instant $t_0$ represents the start of a typical recurrent pulse period. The instant $t_0'$ represents the end of the pulse period which started at the instant $t_0$, or the beginning of the next succeeding period. In the case of the radar system chosen for illustration herein, the pulse period has a duration of 1250 microseconds. The system is designed to measure distances up to a maximum of 25,000 yards, requiring that the apparatus have an active period of at least 153 microseconds this being the time taken by an electromagnetic pulse in traveling a distance of 25,000 yards and return. The instant $t_m$ represents the end of the active portion of the pulse period and marks the beginning of a rest interval extending from $t_m$ to $t_0'$. The time scale is identical in the several graphs making up Fig. 1.

The purpose of the system of Fig. 2 is to receive a potential variation between its input terminals 5 and 6 as at the instant $t_0$ and to produce an output pulse at the output terminals 7 and 8 of the device as at the instant $t$, a very accurately measured interval after the instant $t_0$, which interval may be made adjustable. The instant $t$ may occur in any portion of the active part of the pulse period as exemplified in graph C. Between the instants $t_m$ and $t_0'$, the apparatus is restored to a suitable initial condition in which it remains awaiting the start of the succeeding pulse period. The output pulse is shown in graph G as a negative pulse.

Referring to Fig. 2, the circuit extends between the pair of input terminals 5 and 6 and the pair of output terminals 7 and 8. A plurality of vacuum tubes V3, V4, V5 and V6 are provided, all of which preferably are pentodes. The tube V3 has a cathode 10, a control grid 11, a screen grid 12, a suppressor grid 13 and an anode 14. The control grid 11 may be conductively connected directly to the input terminal 5. The cathode 10 may be conductively connected directly to the input terminal 6 and to the output terminal 8, either or both of which may be grounded. A pair of resistance-capacitance timing circuits are provided under the control of the tube V3, comprising respectively a resistor 15 in series with a condenser 16 and a resistor 17 in series with a condenser 18. The timing circuits are parallel-connected with respect to a suitable source of steady electromotive force which is represented as a battery 19. The tube V3 is so connected to the timing circuits that the anode-cathode path of the tube, preferably in series with a resistor 20, forms a shunt across the condenser 16, and the screen grid-cathode path forms a shunt across the condenser 18. For accurate adjustment, a trimming condenser 21 should be connected in parallel with the condenser 16 as shown. The tube V3 serves to control the charging and discharging of the timing circuits and is in turn controlled by impulses impressed upon the input terminals 5 and 6 as will be more fully described hereinafter.

The tube V4 has a cathode 22, a control grid 23, a screen grid 24, a suppressor grid 25 and an anode 26. The control grid 23 and the screen grid 24 are provided with direct conductive connections through leads 27 and 28, respectively, to the anode 14 and the screen grid 12 of the tube V3. Between the cathode 22 and ground there is included a variable potential from a potentiometer circuit connected across the source 19. The potentiometer circuit may include fixed resistors 29 and 30, an adjustable potentiometer 31 and a rheostat 32. The cathode 22 may be connected to a movable arm 33 of the potentiometer 31 as through a resistor 34. The anode 26 of the tube V4 is preferably connected through an anode circuit resistor 35 to the positive terminal of the source 19. The tube V4 serves to produce a sudden increment of voltage when a critical relation of potentials is present due to the combination of a potential supplied to the control grid 23 from the tube V3 and a potential supplied to the cathode 22 by the potentiometer 31, whereby the tube V4 suddenly becomes conducting, as will be more fully described hereinafter. The tube V5 may have a cathode 36, a control grid 37, a screen grid 38, a suppressor grid 39 and an anode 40. The cathode 36 may be grounded. The control grid 37 may be connected as through a resistor 41 to the junction of a condenser 42 and a resistor 43 in the anode circuit of the tube V4. The anode 40 should be provided with an anode circuit resistor 45.

If desired, sharp pulses of anode current drawn by the tubes V5 and V6 may be kept from possibly disturbing the constancy of the voltage of the source 19 by means of a filter comprising a series resistor 44 and a by-pass condenser 90.

The tube V6 may have a cathode 46, a control grid 47, a screen grid 48, a suppressor grid 49, and an anode 50. The cathode 46 may be connected to the intermediate point of a potential divider comprising resistors 51 and 52. The control grid 47 may be connected to the common terminal of a condenser 53 and a resistor 54 in the anode circuit of the tube V5. The anode 50 of the tube V6 should be provided with an anode circuit resistor 55 and may be connected as through a condenser 56 to the output terminal 7. A resistor 57 is connected between the terminals 7 and 8. The tubes V5 and V6 comprise a pulse generating system which is under the control of the tube V4 as more fully described hereinafter.

In the operation of the system of Fig. 2, the tube V3 is normally held conducting by a positive potential impressed upon the control grid 11 through the terminal 5. In this condition the tube V3 acts substantially as a short circuit across both timing condensers 16 and 18. When the potential impressed upon the control grid of V3 is suitably altered, the tube suddenly becomes non-conducting thereby permitting charging currents to flow into the condensers 16 and 18 from the source 19 through the respective resistors 15 and 17. The grid-cathode circuit of the tube V4 is initially controlled by a positive bias impressed upon the cathode 22 from the potentiometer 31, to hold V4 non-conducting. This initial bias is opposed increasingly during the charging period by a positive potential impressed upon the control grid 23 through the lead 27 from the anode 14 of the tube V3. After a time interval controlled by the setting of the potentiometer arm 33, the positive potential upon the grid 23 becomes sufficient to render the tube V4 suddenly conducting with a resulting sharp decrease in the potential of the anode 26 due to the passage of current through the resistor 35. The negative voltage increment thus generated is impressed by means of the coupling elements 42 and 43 upon the control grid 37 of the tube V5. The application of this pulse causes the tube V5, initially conducting in the absence of any negative bias on the control grid, to become suddenly non-conducting thereby raising the potential of the anode 40 and impressing a short positive pulse upon the control grid 47, of the tube V6 through the instrumentality of the condenser 53 and the resistor 54 which may be so chosen as to have a short time constant. The tube V6, suddenly becoming conducting, impresses a voltage increment upon the circuit branch comprising the condenser 56 and the resistor 57 due to the effect of the resistor 55 in the same manner as before thereby generating a very sharp negative pulse between the terminals 7 and 8. The final pulse may be employed in any desired manner in a utilization system, such as a cathode ray oscilloscope, for example.

A more detailed description of certain aspects of the operation of the system of Fig. 2 will now be given.

Between the time $t_0$ and the time $t_m$, the wave impressed upon the terminals 5 and 6 produces a negative bias upon the control grid 11 of the tube V3, holding the tube in the non-conducting condition. At the time $t_m$, the impressed wave is made positive, rendering the tube V3 conducting, which condition should obtain until time $t_0'$ at which time the impressed wave should suddenly become negative again. A suitable impressed wave, exemplified in Fig. 1, graph B, is readily supplied by known methods.

During the rest interval before the time $t_0$, the impressed wave preferably maintains the control grid 11 at a positive potential with respect to the cathode 10, thereby permitting the passage of anode current and possibly also a moderate amount of grid current. Under this condition, the anode 14 may rest at a very low potential as, for example, about 2 volts above ground. The screen grid 12 may also draw current through the resistor 17 and may rest at a predetermined higher potential as, for example, about 30 volts above ground. At the time $t_0$, the grid 11 is carried sharply negative by the impressed wave, and the anode and screen grid currents of the tube V3 are suddenly interrupted. The condensers 16 and 18, associated respectively with the anode 14 and the screen grid 12 are thereupon charged through the anode and screen grid resistors 15 and 17, respectively. The exponentially rising potential curves of both resistors approach the full supply voltage of the source 19 as an asymptote, which may, for example, be 300 volts.

At the instant $t_m$, the impressed wave restores conduction through V3, which, because of the momentarily high voltages on the screen grid and anode, passes large currents and rapidly discharges the condensers 16 and 18 to the rest condition.

At the instant $t_0$, the first effect of the interruption of the anode current flowing through the resistor 20, is to cause an abrupt increase in the potential of the anode 14. The amount of this potential increase may be predetermined as by suitably selecting the resistance value of the resistor 20. In the system illustrated, the anode current before interruption is 1.5 milliamperes and the resistor 20 is 1000 ohms, giving a potential rise of 1.5 volts. This rise is accomplished very rapidly and brings the anode potential up to the potential then existing at the junction of the resistor 20 and the condenser 16. The time constant which determines the rate of increase of the anode potential is very small, being equal to the product of the resistance of the resistor 20 and the capacitance inherent between ground and the conductor comprising the anode 14 of V3 and the control grid 23 of V4, estimated at about 0.02 microsecond when V3 is a tube known as 6V6-GT and V4 is a 6AC7. The initial potential rise or step is indicated at the point 60 in graph C. The purpose of the step 60 is to allow the range mark in a radar system to be produced as soon as desired after the instant $t_0$ without danger of producing spurious output pulses (when $t$ and $t_0$ are made coincident or nearly so), as will be more fully described hereinafter. The interelectrode shielding of a pentode in the position of V3 prevents the large transient potential on its control grid, at time $t_0$, from distorting the step 60 or disturbing the essential linearity of the early portion of the potential rise on the condenser 16.

Synchronously with the step 60, the timing condenser 16 and the trimming condenser 21 begin to be charged through the resistor 15. The time constant of this, the anode circuit, may conveniently be chosen so that the voltage across the condenser 16 will attain a predetermined fraction, such as one-third, of the potential difference between the starting point and the 300 volt asymptote in the time corresponding to the full range of 25,000 yards. For a delay of 152.6 microseconds corresponding to the maximum range of 25,000 yards, the time constant R. C. may be calculated from the well-known law of charging circuits by use of the following equation $$E_0\left(1 - \epsilon^{\frac{-t}{RC}}\right) = \frac{1}{3}E_0$$

In the present example, the time $t$ is 152.6 microseconds and the value of the time constant (R. C.) is calculated to be 376 microseconds. Here $E_0$, the asymptotic voltage cancels out of the calculation.

It is necessary that some specific fraction of the asymptote be used, so that the potentiometer 31 may be designed accordingly. The choice of $$\frac{1}{3}$$

represents what was found to be a good compromise in a particular case between the need to use as much of the steep early part of the charging curve as possible for the sake of precision and the desirability of keeping the cathode 22 near enough to ground potential to avoid using a special ungrounded filament transformer winding in the heating circuit for the cathode 22.

Figure 3:
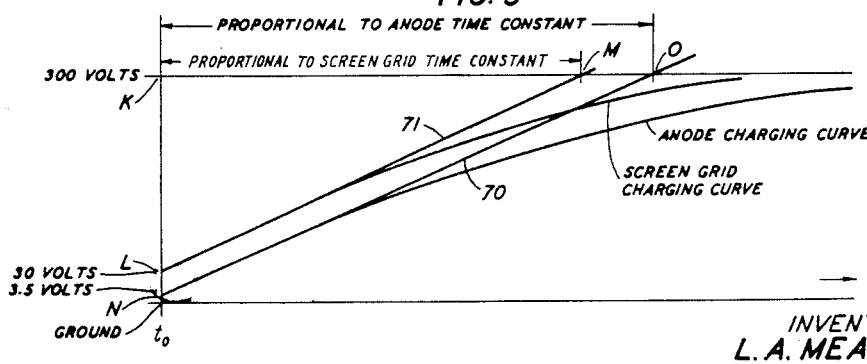
Fig. 3 is a diagram useful in explaining the calculation of the time constant of one portion of the timing circuit of Fig. 2.

In accordance with the invention, the time constant of the screen grid charging circuit is to be chosen so that the charging curve for the screen grid circuit shall remain substantially parallel to the charging curve for the anode throughout the active period. Assuming that in the present case the screen grid potential starts a known differential above the anode potential, this differential should be maintained with good accuracy over the useful portion of the charging period. In the system illustrated, 26.5 volts is the potential difference between the screen grid and the anode when charging begins, the difference being composed of the initial 28 volt difference (between 30 volts and 2 volts) diminished by the 1.5 volts of the step 60. It has been found satisfactory to use an approximate parallelism of the charging curves which is obtainable by starting the screen grid curve with the same slope as the anode curve, as shown diagrammatically in Fig. 3. Although the curvatures of the two charging curves are not made identical by this procedure, the resultant error in parallelism has been found to be of negligible effect. Accordingly, if tangents to the charging curves at time $t_0$ are extended to meet the asymptote at 300 volts, as indicated by the parallel lines 70 and 71 in Fig. 3, there can be formed two similar triangles, KLM for the screen grid circuit and KNO for the anode circuit. The horizontal legs KM and KO of the respective triangles are proportional to the time constants of the screen grid and anode charging circuits under the given conditions. From the similarity of the triangles, the screen grid time constant may be calculated as follows:

Screen grid time constant equals $$\left(\frac{300-30}{300-3.5}\right)376 = 342 \text{ microseconds}$$

To secure precision in the range calibration, wire-wound resistors and silvered-mica condensers are preferable in both the anode and screen grid circuits and temperature control within ±1° F. at about 140° F. is desirable. The effect of temperature variations upon the calibration has been estimated at about 0.01 per cent per degree Fahrenheit of which about 0.008 per cent per degree Fahrenheit is attributable to the resistor and 0.001 per cent per degree Fahrenheit to the condenser.

Range in a radar system may be indicated on a uniformly graduated dial carried by the shaft of the potentiometer 31 in known manner. This potentiometer may have a special tapered winding and its function is to control the amount of delay between the receipt of a synchronizing pulse at the instant $t_0$ and the production of a range pulse at the instant $t$. The potentiometer 31 determines the cathode potential E (Fig. 1, C) of the tube V4. The step 60 and exponential potential rise on the anode of V3 are applied to the control grid 23 of V4, while the screen exponential potential rise of V3 is impressed on the screen grid 24 of V4. Conduction begins in V4 at time $t$, when the grid passes through the cut-off potential (at point $r$, graph C, Fig. 1). It will be noted that because of the use of the two nearly parallel exponentials, the screen potential of V4 is always the same with respect to the control grid and hence also with respect to the cathode of V4 at the instant of the start of conduction, regardless of the setting of the range potentiometer 31. In other words, the vertical distance between points $q$ and $r$ (Fig. 1, C) is constant for all cathode potentials employed.

Because of the low value of the screen voltage of V4, at the critical moment, the difference between its cut-off and cathode potentials is small, and because this screen voltage is constant for all range settings, the aforesaid difference is held substantially constant. Variation of this cut-off potential difference as a function of range would contribute range errors. Such variations would result if, for example, the screen of V4 were established at some potential fixed with respect to ground, while the cathode voltage varied under control of the potentiometer 31. Errors of this sort, being somewhat dependent upon the particular tube used, could not be fully corrected in the design of the taper of the potentiometer. Small variations in the cut-off potential due to aging of V4 can be compensated almost perfectly by readjustment of the rheostat 32. The correction also afforded by the rheostat 32 for variations in the rest potential from which the grid wave starts, due to aging of V3, is theoretically exact.

In graph C the cathode potential of V4 is shown, to avoid confusion, as a straight line. Actually, the passage of anode current through V4 during the interval between $t$ and $t_m$ causes the cathode to rise along with the control grid, and for short range settings, grid current limits the rise of the control grid potential soon after time $t$. The resistor 34 allows the cathode 22 to follow the grid for some distance before grid current is drawn, even at zero range where the resistance in the cathode path through the range potentiometer 31 would otherwise be low. This postponement of grid current is desirable as when a section of the exponential before and after the range mark is amplified to form a precision sweep, which part of the exponential must therefore be undistorted. The production of a precision sweep in this manner is disclosed and claimed in my copending application Serial No. 563,559, filed November 15, 1944, and assigned to the assignee of the present application.

At the instant $t$, the anode of V4 begins a negative transient (graph D) which cuts off the plate current normally passed by V5. When the resulting positive pulse (graph E) applied by the plate of V5 to the grid of V6, reaches the cut-off potential of the latter, V6 suddenly passes large plate and screen currents. Positive feedback from the screen of V6 through a pair of coupling condensers 80 and 81 to the grid of V5 reenforces the pulse from V4, and results in an extremely fast triggering action. The large negative anode pulse (graph F) is differentiated by the condenser 56 and the resistor 57 to provide a range pulse (graph G) between the output terminals 7 and 8. At the instant $t_m$ when the rest period starts, the impressed wave becoming positive renders V3 conducting, thereby rapidly lowering the potential of the anode 14 together with that of the control grid 23 of V4 to about two volts above ground. The cathode 22 of V4 has a relatively large positive potential due to its connection to the potentiometer 31. Accordingly, the tube V4 is held non-conducting during the rest period, by virtue of the control grid being biased negatively with respect to the cathode by an amount in excess of the requirement for anode current cut-off.

If tube V4 were not completely cut off during the rest interval, very small amounts of noise or crosstalk on its grid would trigger the tubes V5 and V6 and cause spurious output pulses. Provision of the step 60 is instrumental in avoiding difficulty due to this effect at close range settings; for without it the cut-off potential of V4 would become coincident with the rest potential of the grid when $t$ is made to approach $t_0$, so that the tube would then be on the verge of conduction. This may be seen by reference to Fig. 1, graph C, where if the cathode potential E is made to approach zero, the cut-off potential of V4 and the potential of grid 23 are brought close together during the rest period.

What is claimed is:

1. A timing system comprising a space discharge device having a cathode, an anode, a control grid, and a screen grid, means to establish an initial difference of potential between said control grid and said screen grid, means effective from the beginning of a time interval to be measured to increase the potential of said control grid at a substantially constant time rate, and means effective simultaneously with said control grid potential increasing means to increase the potential of said screen grid at substantially the same time rate, whereby the initial potential difference between said screen grid and said control grid is substantially maintained while the control grid potential increases over an extended range of values of potential.

2. A timing system comprising a space discharge device having a cathode, an anode, a control grid, and a screen grid, means to establish an initial difference of potential between said control grid and said screen grid, means effective from the beginning of a time interval to be measured to increase the potential of said control grid at a substantially constant time rate, means effective simultaneously with said control grid potential increasing means to increase the potential of said screen grid at substantially the same time rate, whereby the initial potential difference between said screen grid and said control grid is substantially maintained while the control grid potential increases over an extended range of values of potential, and means operative upon said space discharge device while said potential difference is being maintained between the control grid and screen grid thereof to signalize the end of the said time interval to be measured.

3. A timing system comprising a space discharge device having a cathode, an anode, a control grid, and a screen grid, a source of constant potential, means to determine the initial potential of said screen grid at a value relatively low compared to the full potential of said source, means to determine the initial potential of said control grid at a value materially less than the initial potential of said screen grid, means effective from the beginning of a time interval to be measured to increase the potential of said control grid at a substantially constant time rate and means effective simultaneously with said control grid potential increasing means to increase the potential of said screen grid at substantially the same time rate, whereby the initial potential difference between said screen grid and said control grid is substantially maintained while the control grid potential increases over a material portion of the potential of said source.

4. A timing system comprising a space discharge device having a cathode, an anode, a control grid, and a screen grid, a source of constant potential, means to determine the initial potential of said screen grid at a value relatively low compared to the full potential of said source, means to determine the initial potential of said control grid at a value materially less than the initial potential of said screen grid, means effective from the beginning of a time interval to be measured, to increase the potential of said control grid at a substantially constant time rate, means effective simultaneously with said control grid potential increasing means to increase the potential of said screen grid at substantially the same time rate, whereby the initial potential difference between said screen grid and said control grid is substantially maintained while the control grid potential increases over a material portion of the potential of said source, and means to alter the conductivity of said space discharge device to mark the end of said time interval to be measured, said last mentioned means becoming operative while the said potential difference is being maintained between the control grid and the screen grid.

5. A timing system comprising a space discharge device having a cathode, an anode, a control grid, and a screen grid, a source of constant potential, means to determine the initial potential of said screen grid at a value relatively low compared to the full potential of said source, means to determine the initial potential of said control grid at a value materially less than the initial potential of said screen grid, a pair of charging circuits, means effective at the beginning of a time interval to be measured to connect in operative relation between said source and said screen grid one of said charging circuits to add a transient potential to the initial potential of said screen grid, and means effective simultaneously with the connection of said first connecting means to connect in operative relation between said source and said control grid the other of said charging circuits to add a transient potential to the initial potential of said control grid, said respective charging circuits being subjected to unequal charging potentials and having unequal time constants whereby the initial potential difference between said screen grid and said control grid is maintained substantially constant while the control grid potential is increased over a material portion of the potential of said source.

6. A timing system comprising a space discharge device having a cathode, an anode, a control grid, and a screen grid, a source of constant potential, means to determine the initial potential of said screen grid at a value relatively low compared to the full potential of said source, means to determine the initial potential of said control grid at a value materially less than the initial potential of said screen grid, a pair of charging circuits, means effective at the beginning of a time interval to be measured to connect in operative relation between said source and said screen grid one of said charging circuits to add a transient potential to the initial potential of said screen grid, means effective simultaneously with the connection of said first connecting means to connect in operative relation between said source and said control grid the other of said charging circuits to add a transient potential to the initial potential of said control grid, and means effective at the end of the said time interval to be measured to remove said transient potentials from said control grid and from said screen grid, said respective charging circuits being subjected to unequal steady charging potentials and having unequal time constants whereby the initial potential difference between said screen grid and said control grid is maintained substantially constant throughout said time interval to be measured regardless of its length over an extended range.

7. A timing system comprising a space discharge device having a cathode, an anode, a control grid, and a screen grid, a source of constant potential, a pair of separate charging circuits supplying transient potentials to said control grid and to said screen grid, respectively, said charging circuits being supplied with current from said source of constant potential, means to establish an initial potential difference between said control grid and said screen grid, means to start charging currents simultaneously in said respective charging circuits, and means to impress a calibrated potential upon said cathode, whereby said space discharge device becomes conductive upon passing through a critical potential difference between said cathode and said control grid to indicate the end of a time interval measured from the start of said charging currents, the respective charging circuits differing in time constant and having unequal impressed charging potentials whereby the potential difference between the screen grid and the control grid is substantially the same at the start of conduction in said space discharge device regardless of the length of the time interval measured over an extended range whereby calibration errors due to a varying potential difference between the control grid and the screen grid are substantially prevented.

LARNED A. MEACHAM.